UNITED STATES PATENT OFFICE.

WILLIAM G. HAMILTON, OF RAMAPO, NEW YORK, ASSIGNOR TO THE HAMILTON STEELED WHEEL COMPANY, OF PHILADELPHIA, PA.

ART OF MANUFACTURING CAST CHILLED RAILROAD-WHEELS.

SPECIFICATION forming part of Reissued Letters Patent No. 9,487, dated December 7, 1880.

Original No. 85,089, dated December 22, 1868; Reissue No. 5,298, dated February 25, 1873. Application for reissue filed July 24, 1880.

*To all whom it may concern:*

Be it known that I, WILLIAM G. HAMILTON, formerly of the city, county, and State of New York, but now residing at Ramapo, in the county of Rockland and State of New York, have invented a certain new and useful Improvement in the Art of Manufacturing Cast Chilled Railroad-Wheels, of which improvement the following is a specification.

The best cast chilled railroad-wheels in use prior to my invention were made from iron; but the extraordinary requirements of our railroad service demand greater strength than has been found derivable from this metal, which, in other respects, possesses all the qualities, including the chilling properties, that are essential in this branch of manufacture, and affords such wheels, too, at a moderate cost. On the other hand, cast-steel—a metal that possesses strength adequate to the aforesaid requirements—does not possess the chilling properties of iron, and, not being susceptible of a chill, a railroad-wheel made of cast-steel lacks that durability in its tread or wearing-surface which is scarcely less essential than strength in its plate and hub; and their original cost being comparatively very great, and this cost being enhanced by their rapidly wearing out from the lack of a chilled tread, cast-steel wheels have not been manufactured to any extent, and their manufacture is commercially impracticable in this country.

It is the object of my invention to produce a cast chilled railroad-wheel in which the strength of cast-steel shall be combined with the durability of cast-iron, and to obtain such a product without resorting to processes or appliances so expensive as to be prohibitory.

In my experiments directed to the attainment of this result I discovered that a charge composed of a mixture of cast iron and steel or steely metals, the relative proportions being substantially such as hereinafter mentioned, can be melted together in a cupola or furnace, such as is ordinarily used for melting the iron from which cast-iron car-wheels have ordinarily been made, and that this mixture can be brought to a fluid condition sufficiently low in respect to temperature to cast in the chill-molds such as have heretofore been ordinarily used in the manufacture of chilled cast-iron railroad-wheels, and that with such a mixture of iron and steel or steely metals thus melted together I can obtain in such molds a cast chilled wheel with an unimpaired depth and hardness of chill in the tread and of greater strength than can be derived from cast-iron alone.

In my experiments directed to the attainment of this result I have used a mixture of cast steel and iron and a mixture of low steel and iron, melting them together in a cupola or other furnace, and I have obtained in such cases good results, demonstrating the decided improvement in the art accomplished by my invention. I therefore contemplate using cast-steel or low steel or mixed cast-steel and low steel. The iron may be any suitable pig or cast irons or pig and cast iron mixed with due regard to its chilling properties, as is usual in the manufacture of cast-iron railroad-wheels.

I also contemplate using, with proper iron, steel in the form of sponge made direct from the ore, either alone or with cast-steel, or with low steel, or with both cast-steel and low steel.

In practicing my invention the relative proportions of the steel or steely metals to the iron cannot be governed by any fixed formula, but must be left, in each particular case, to the judgment of the mixer, in view of the qualities and properties of the materials he may be using. The proportion of iron must be such as to preserve its chilling properties, and the proportion of steel or steely metals must be such that the mixture may be melted together in a cupola or furnace and brought to a fluid condition, ready for casting, at a point sufficiently low in respect to temperature for pouring into the ordinary molds with a chill. It will suffice to say, in this behalf, that I contemplate using in all cases more iron than steel or steely metals, and I give as instances from which I have derived satisfactory results, iron, say sixty-seven parts, and steel, say thirty-three parts; or iron, say sixty parts, and low steel, (Bessemer clippings,) say forty parts.

For steel sponge alone, however, I would say fifty parts to fifty parts of iron.

The metals are melted together in a cupola or furnace such as is ordinarily used for melting cast-iron from which railroad-wheels are to be made, and the molten mixture is run into the ordinary molds with a metal chill such as are ordinarily used in making such cast-iron chilled wheels, as is well understood. The product will be a smooth casting having a chilled tread, and also having throughout the quality of resistance to tensile strains in a higher degree than has heretofore been obtained from any metal or mixture of metals which can be cast at a temperature sufficiently low to chill. The wheel thus cast may be slow cooled or annealed by any of the well-known processes.

Having thus described the nature and objects of my invention, what I claim as new, and desire to secure by Letters Patent, is—

As an improvement in the art of manufacturing cast chilled wheels for railroads, making such wheels from a mixture of iron and steel or steely metals melted together in a cupola or furnace, and cast in the ordinary molds against a chill, substantially as described.

WILLIAM G. HAMILTON.

Witnesses:

J. WALTER DOUGLASS,

GEO. F. FINDLAY.